United States Patent
Xiong et al.

(10) Patent No.: US 11,886,484 B2
(45) Date of Patent: Jan. 30, 2024

(54) MUSIC PLAYING METHOD AND APPARATUS BASED ON USER INTERACTION, AND DEVICE AND STORAGE MEDIUM

(71) Applicant: Lemon Inc., Grand Cayman (KY)

(72) Inventors: Tao Xiong, Beijing (CN); Shihkuang Chu, Los Angeles, CA (US); Hao Huang, Beijing (CN); Shaoyuan Li, Beijing (CN); Chenyu Sun, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 18/087,576

(22) Filed: Dec. 22, 2022

(65) Prior Publication Data

US 2023/0131975 A1 Apr. 27, 2023

Related U.S. Application Data

(63) Continuation of application No. PCT/SG2021/050513, filed on Aug. 27, 2021.

(30) Foreign Application Priority Data

Oct. 27, 2020 (CN) .......................... 202011163846.9

(51) Int. Cl.
*G06F 16/435* (2019.01)
*G06F 16/44* (2019.01)

(52) U.S. Cl.
CPC ............ *G06F 16/435* (2019.01); *G06F 16/44* (2019.01)

(58) Field of Classification Search
CPC ......... G06F 16/435; G06F 16/44; G06F 3/165
See application file for complete search history.

(56) References Cited

U.S. PATENT DOCUMENTS

2012/0007884 A1 1/2012 Kim
2012/0092167 A1 4/2012 Hohl
(Continued)

FOREIGN PATENT DOCUMENTS

CN 108829253 A 11/2018
CN 110827789 A 2/2020
(Continued)

OTHER PUBLICATIONS

International Search Report in PCT/SG2021/050513, dated Nov. 26, 2021, 5 pages.
(Continued)

*Primary Examiner* — Fan S Tsang
*Assistant Examiner* — David Siegel
(74) *Attorney, Agent, or Firm* — ARENTFOX SCHIFF LLP

(57) ABSTRACT

A music playing method and apparatus based on user interaction, a device and a storage medium, which relate to the technical field of music videos. The method includes: capturing a target video through a video capturing apparatus; determining an audio processing mode corresponding to a target action when it is identified in the target video that a target object presents the target action; and playing music according to the audio processing mode. The target video is captured by the video capturing apparatus, and when the target object in the target video is identified to generate the target action, the corresponding audio processing mode is determined based on the target action, and music is played according to the audio processing mode.

18 Claims, 4 Drawing Sheets

(56) References Cited

U.S. PATENT DOCUMENTS

| | | | |
|---|---|---|---|
| 2013/0050069 A1* | 2/2013 | Ota | G06F 3/0304 |
| | | | 345/156 |
| 2013/0239782 A1 | 9/2013 | Yoshihama | |
| 2017/0287456 A1 | 10/2017 | Zund et al. | |
| 2020/0020310 A1 | 1/2020 | Kumar et al. | |
| 2020/0074738 A1* | 3/2020 | Hare | G06T 19/006 |
| 2020/0202825 A1* | 6/2020 | Kolen | G10H 1/46 |

FOREIGN PATENT DOCUMENTS

| | | |
|---|---|---|
| CN | 111399745 A | 7/2020 |
| CN | 111757163 A | 10/2020 |
| KR | 20190118994 A | 10/2019 |

OTHER PUBLICATIONS

Extended European Search Report in EP21887046.7, dated Sep. 13, 2023, 8 pages.

* cited by examiner

MUSIC PLAYING METHOD AND APPARATUS BASED ON USER INTERACTION, AND DEVICE AND STORAGE MEDIUM

This application is a continuation of International Application No. PCT/SG2021/050513 filed on Aug. 27, 2021, which claims the priority to and benefits of Chinese Patent Application No. 202011163846.9, filed on Oct. 27, 2020. All the aforementioned patent applications are hereby incorporated by reference in their entireties.

TECHNICAL FIELD

The present disclosure relates to a music playing method and apparatus based on user interaction, a device, and a storage medium.

BACKGROUND

At present, multimedia interactive platforms have become an important part of people's lives. Users can record videos on these platforms and create different video contents according to different music.

However, on these known platforms, users can only create video content based on the music they select when recording videos. For all users, they can only create videos based on the music provided by a system, selected locally or downloaded from the Internet, which cannot meet the needs of music lovers who want to edit music freely according to their own preferences and create their own personalized music.

It can be seen that when users select music for creation through a multimedia interactive platform, the selected music can only be known, resulting in insufficient personalization of the music created by users and poor user experience.

SUMMARY

The purpose of the present disclosure is to solve at least one of the above-mentioned technical defects, especially the technical defect: when users select music for creation through a multimedia interactive platform, the selected music can only be known, resulting in insufficient personalization of the music created by users and poor user experience.

In a first aspect, a music playing method based on user interaction is provided, and the method includes:
capturing a target video through a video capturing apparatus;
determining an audio processing mode corresponding to a target action when a target object is identified to present the target action in the target video; and
playing music according to the audio processing mode.

In a second aspect, a music playing apparatus based on user interaction is provided, and the apparatus includes:
a target video capturing module, which is configured to capture a target video through a video capturing apparatus;
a target action identification module, which is configured to determine an audio processing mode corresponding to a target action when a target object is identified to present the target action in the target video; and
a music playing module, which is configured to play music according to the audio processing mode.

In a third aspect, an electronic device is provided, and the electronic device includes:
one or more processors;
a memory; and
one or more application programs, the one or more application programs are stored in the memory and configured to be executed by the one or more processors, and the one or more application programs are configured to execute the music playing method based on user interaction according to the above-mentioned first aspect.

In a fourth aspect, a storage medium is provided, the storage medium stores at least one instruction, at least one piece of program, a code set or an instruction set, and the at least one instruction, the at least one piece of program, the code set or the instruction set is loaded and executed by a processor to implement the music playing method based on user interaction according to the above-mentioned first aspect.

In the embodiments of the present disclosure, the target video is captured by the video capturing apparatus, and when the target object in the target video is identified to generate the target action, the corresponding audio processing mode is determined based on the target action, and music is played according to the audio processing mode. Users can create personalized music according to their own operation through the video, and the music creation is not restricted, which can enhance the fun of music creation and improve the user experience.

BRIEF DESCRIPTION OF THE DRAWINGS

In order to more clearly illustrate the technical solutions in the embodiments of the present disclosure, the following will briefly introduce the drawings that need to be used in the description of the embodiments of the present disclosure.

Figure 1:
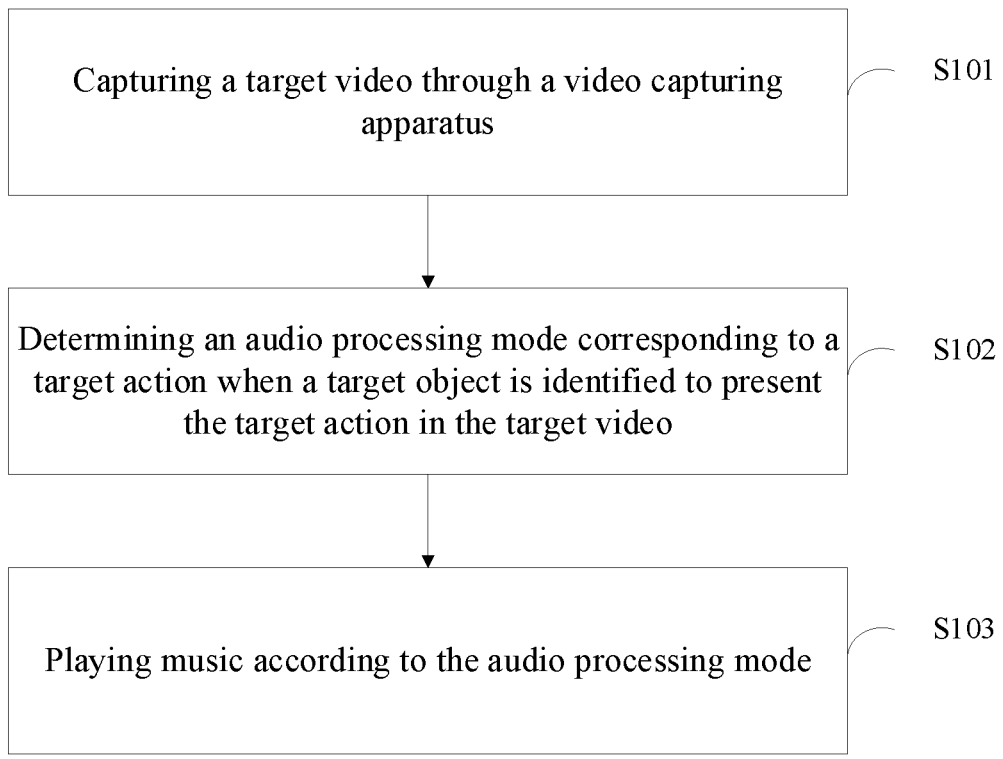
FIG. 1 is a schematic flowchart of a music playing method based on user interaction provided by at least an embodiment of the present disclosure.

In combination with the drawings and referring to the following specific embodiments, the above-mentioned and other features, advantages, and aspects of the embodiments of the present disclosure will become more apparent. Throughout the drawings, the same or similar reference numbers refer to the same or similar elements. It should be understood that the drawings are schematic, and the components and elements are not necessarily drawn to scale.

DETAILED DESCRIPTION

Embodiments of the present disclosure will be described in more detail below with reference to the drawings. While certain embodiments of the present disclosure are shown in the drawings, it should be understood that the present disclosure may be embodied in various forms and should not be construed as limited to the embodiments set forth herein. Rather, these embodiments are provided for a thorough and complete understanding of the present disclosure. It should be understood that the drawings and embodiments of the present disclosure are only for exemplary purposes and are not intended to limit the protection scope of the present disclosure.

It should be understood that the various steps described in the method embodiments of the present disclosure may be performed in different orders and/or in parallel. Furthermore, the method embodiments may include additional steps and/or omit performing the illustrated steps. The protection scope of the present disclosure is not limited in this aspect.

As used herein, the term "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

It should be noted that concepts such as the "first," "second," or the like mentioned in the present disclosure are only used to distinguish different apparatus, modules or units, and are not used to limit these apparatus, modules or units to be different apparatus, modules or units, nor to limit the interdependence relationship or the order of functions performed by these apparatus, modules or units.

It should be noted that the modifications of "a," "an," "a plurality of," or the like mentioned in the present disclosure are illustrative rather than restrictive, and those skilled in the art should understand that unless the context clearly indicates otherwise, these modifications should be understood as "one or more."

The names of messages or information exchanged between multiple apparatus in the embodiments of the present disclosure are only for illustrative purposes, and are not intended to limit the scope of these messages or information.

The music playing method and apparatus based on user interaction, device and storage medium provided by the present disclosure aim to solve the above-mentioned technical problems of the known technology.

The technical solutions of the present disclosure and how the technical solutions of the present disclosure solve the above-mentioned technical problems will be described in detail below with specific embodiments. The following specific embodiments may be combined with each other, and the same or similar concepts or processes may not be repeated in some embodiments. The embodiments of the present disclosure will be described below with reference to the drawings.

An embodiment of the present disclosure provides a music playing method based on user interaction. As shown in FIG. 1, the method includes:

step S101, capturing a target video through a video capturing apparatus;

step S102, determining an audio processing mode corresponding to a target action when a target object is identified to present the target action in the target video; and step S103, playing music according to the audio processing mode.

The music playing method based on user interaction provided by the embodiment of the present disclosure is applied to a terminal device, which may be an application (APP) in the terminal device, or a function in a certain APP. The terminal device may be configured with a video capturing apparatus, which may optionally be a front-facing camera. Users can trigger a music playing trigger operation of the music playing method through the terminal device, and the terminal device captures the target video through the video capture device based on the music playing trigger operation. When the target object is identified to present the target action in the target video, the corresponding audio processing mode is determined according to the target action, and music is played according to the audio processing mode. Users can create personalized music according to their own operation, and the music creation is not restricted, which can enhance the fun of music creation and improve the user experience.

In the embodiment of the present disclosure, the music playing trigger operation refers to an operation of a user opening an APP which can implement the music playing method based on user interaction provided by the present disclosure, or an operation of opening a certain function implemented based on the method in the APP, and this function can implement the music playing method based on user operation provided by the present disclosure. In the embodiment of the present disclosure, the target object may be a certain part of a human body in the target video, such as hands, feet, mouth, etc., and the target action may be movement of hands or feet or opening and closing of the mouth. In the embodiments of the present disclosure, the corresponding audio processing mode may be determined according to the target action presented by the target object, and music is played according to the audio processing mode.

For the embodiment of the present disclosure, for the convenience of description, taking a specific embodiment as an example, the music playing method based on user interaction provided by the embodiment of the present disclosure may be implemented as a music editing function in a certain APP, and a music generation trigger operation of a user may be an operation to open the music editing function in the APP, such as clicking a virtual button corresponding to the music editing function on an interface of the APP, or to open the music editing function through operations such as voice or gesture. In response to the music generation trigger operation, the terminal device captures the target video through the video capturing apparatus, optionally, the target video can be displayed through a display interface of the terminal device and the content in the target video can be identified. As an embodiment of the present disclosure, when it is identified that a target object exists in the target video and the target object presents the target action, the audio processing mode corresponding to the target action is determined. Optionally, the target object may be a part of the human body in the target video, such as hands, feet, mouth, etc., and the target action may be the movement of hands, feet, or the opening and closing of the mouth. As an embodiment of the present disclosure, the target object presenting the target action may be that a hand of a person in the target video touches a certain part of a playing interface in the video. Optionally, when determining the audio processing mode corresponding to the target action, the audio processing mode associated with the part may be determined based on the part corresponding to the target action. Optionally, the audio processing modes corresponding to different parts are different. After the corresponding audio processing mode is determined, the music is played according to the audio processing mode.

In the embodiment of the present disclosure, the target video is captured by the video capturing apparatus. When the target object is identified to present the target action in the target video, the corresponding audio processing mode is determined according to the target action, and music is played according to the audio processing mode. Users can create personalized music according to their own operation, and the music creation is not restricted, which can enhance the fun of music creation and improve the user experience.

The embodiments of the present disclosure provide a possible implementation. In this implementation, the audio processing mode specifically includes: adding a target audio track corresponding to the target action in the music for playing.

In the embodiments of the present disclosure, playing music according to the audio processing mode may refer to adding a target audio track corresponding to the target action in the music for playing.

For the embodiments of the present disclosure, different target actions may correspond to different audio processing modes, and different audio processing modes may correspond to playing different audio tracks. Optionally, playing music according to the audio processing mode may refer to adding an audio track corresponding to the audio processing mode in the music for playing. As an embodiment of the present disclosure, the audio track may be a preset piece of music, or a preset piece of music played by an instrument, optionally, a paragraph played by a certain instrument in the preset music. Determining the corresponding audio processing mode based on target action may refer to determining the corresponding audio track based on the target action, and the audio track may be added to the music for playing. As an embodiment of the present disclosure, in the case where the audio track determined based on the target action is a piece of music played by a piano, when playing the music according to the audio processing mode, the piece of music played by a piano may be added to the music for playing.

The embodiment of the present disclosure determines the corresponding audio processing mode based on the target action and determines the corresponding audio track. When playing music according to the audio processing mode, the corresponding audio track is added to the music for playing. Users can add different audio tracks to the music through actions, which is highly creative for the music.

The embodiments of the present disclosure provide a possible implementation, in which the target action specifically includes a touch action, on a playing interface of the target video, of the target object to a target position on the playing interface; and the target position corresponds to the target audio track.

In the embodiments of the present disclosure, the target video is displayed through the playing interface, and the target object is a hand of a person in the target video. Correspondingly, the target action is that the hand touches a certain position in the playing interface. Optionally, when the target action touches different positions, the corresponding target tracks are different.

For the embodiments of the present disclosure, the target audio track corresponds to the target position of the playing interface. Optionally, in the case where the target action is to touch a certain position on the playing interface, it is determined that the audio processing mode corresponding to the target action is playing the audio track corresponding to the position. As an embodiment of the present disclosure, the audio track corresponding to the upper left corner of the playing interface is a piece of music played by a guitar, then when the target action is identified as touching the upper left corner of the playing interface, the piece of music played by a guitar is added to the music to play.

By corresponding the audio track to the position of the playing interface, the embodiments of the present disclosure trigger the playing of the audio track through the touch of the target object in the video to the playing interface for music creation.

The embodiments of the present disclosure provide a possible implementation, in which the target audio track is configured to carry an audio of a target music material, and the target position on the playing interface is marked with an identifier of the target music material.

Figure 2:
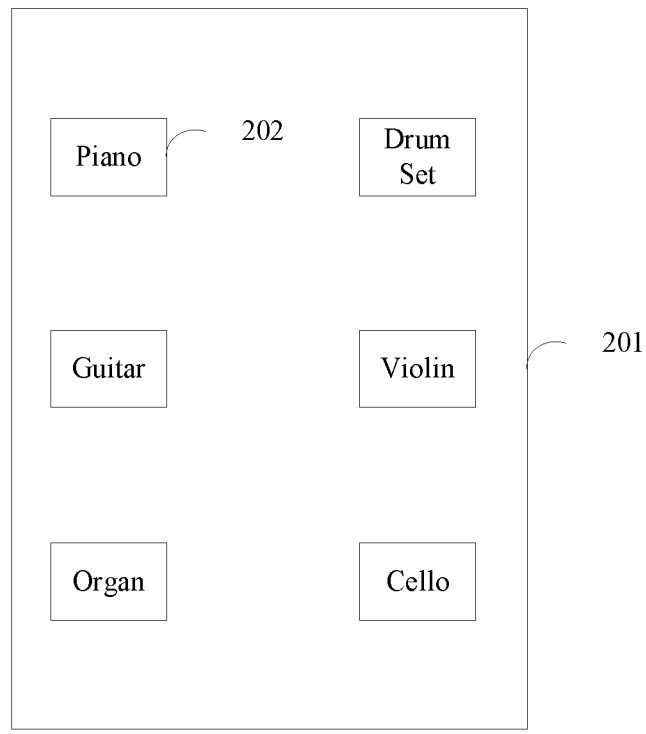
FIG. 2 is a schematic diagram of a display of music material identifiers provided by at least an embodiment of the present disclosure.

FIG. 2 shows a playing interface. In the embodiment of the present disclosure, at least one music material identifier 202 are displayed on the playing interface 201, one music material identifier represents an instrument, such as a piano, a drum set, a harmonica, etc., and the corresponding music identifier is determined based on the target action of the target object in the target video. In the embodiment of the present disclosure, the music material identifier(s) displayed on the playing interface may be preconfigured, and the preconfigured music material identifier(s) may be one or more fixed identifiers of one or more music materials, or may be one or more identifiers of one or more music materials automatically configured according to different music or different music types. For example, the user may select the music or music type they want to edit, and after the user's selection operation is introduced, the terminal device displays the corresponding at least one music material identifier according to the music or music type selected by the user. Optionally, the played music may be a song that the user selects in advance, or a preconfigured song provided by the APP. In the case where the target action corresponds to the identifier of the piano in the playing interface, the audio track of the piano in the music material is added to the music to play. Optionally, the user can select music, and a music selection interface is displayed based on a music selection operation of the user. The music selection interface displays music to be selected, and the user can select at least one from the music to be selected, then the music material identifier may include an identifier of a music material corresponding to an audio track included in the music selected by the user, and the music material identifier may also include identifiers of other music materials. Optionally, the user may click on multiple music material identifiers at the same time, and at this time, the audio tracks corresponding to the multiple music materials will be output.

In the embodiment of the present disclosure, by displaying the identifier of the music material at the target position of the playing interface, users can select the audio tracks corresponding to different music materials to process the music according to their music requirements.

The embodiments of the present disclosure provide a possible implementation. In the implementation, the audio processing mode specifically includes: processing the music according to a target sound effect corresponding to the target action for playing; and the target action is specifically an action matching a preset posture, and the preset posture corresponds to the target sound effect.

In the embodiment of the present disclosure, specific special effects may be added to music by identifying the target action in a video of the user.

For the embodiment of the present disclosure, for the convenience of description, taking a specific embodiment as an example, the target object may be the user's hand, mouth, head, eyes, etc., and music special effects are added to the music based on the target action of the target object. Optionally, according to the action of the target object, specific processing may be performed for the music corresponding to the music material identifier corresponding to the target object. For example, when the user's hand stays in a display region of the piano identifier, the loudness and pitch of the piano track may be adjusted based on the stretching action of the fingers. Alternatively, the target object is the user's mouth, and based on the opening and closing of the user's mouth, the trill effect is added to the music. For example, when the user's mouth is open, the trill effect is added to the music. Of course, the way to add music effects is not limited to the embodiments provided in the present disclosure.

In the embodiments of the present disclosure, music special effects are added to music through target actions, and music creation is more diverse.

Figure 3:
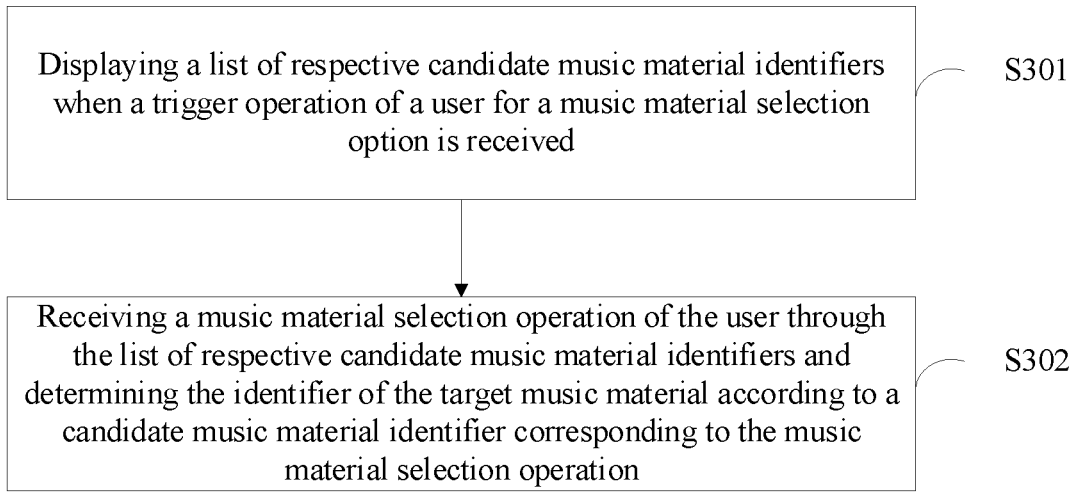
FIG. 3 is a schematic flowchart of a method for selecting music material identifiers provided by at least an embodiment of the present disclosure.

The embodiments of the present disclosure provide a possible implementation, as shown in FIG. 3, in this implementation, a music material selection option is displayed on the playing interface, and the method further includes:

step S301, displaying a list of respective candidate music material identifiers when a trigger operation of a user for a music material selection option is received; and step S302: receiving a music material selection operation of the user through the list of respective candidate music material identifiers and determining the identifier of the target music material according to a candidate music material identifier corresponding to the music material selection operation.

In the embodiment of the present disclosure, the identifier of the music material displayed on the playing interface may be selected by the user.

Figure 4:
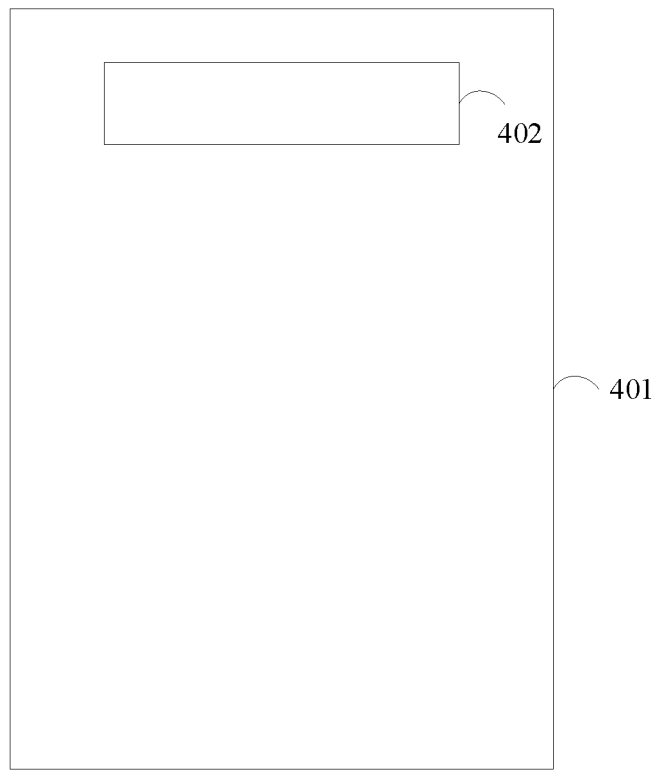
FIG. 4 is a schematic diagram of a music material selection option provided by at least an embodiment of the present disclosure.

For the embodiments of the present disclosure, for the convenience of description, a specific embodiment is taken as an example. As shown in FIG. 4, when a terminal device displays a playing interface 401, the playing interface 401 displays a music material selection option 402. When a trigger operation of the user for the music material selection option is received, a list of respective candidate music material identifiers is displayed, the music material selection operation of the user is received through the list of respective candidate music material identifiers, and the identifier of the target music material is determined according to the music material identifier corresponding to the music material selection operation. Specifically, according to the music material selection operation of the user, all the music materials selected by the user may be served as the music materials displayed on the music generation interactive interface. On the premise that the user has selected music, it can also be the music material included in the music selected by the user, and in the case where the music materials selected by the user do not all contain the music materials included in the music, the identifiers of the music materials selected by the user may be displayed on the playing interface, while the music materials not selected by the user but included in the music may also be displayed on the playing interface.

Figure 5:
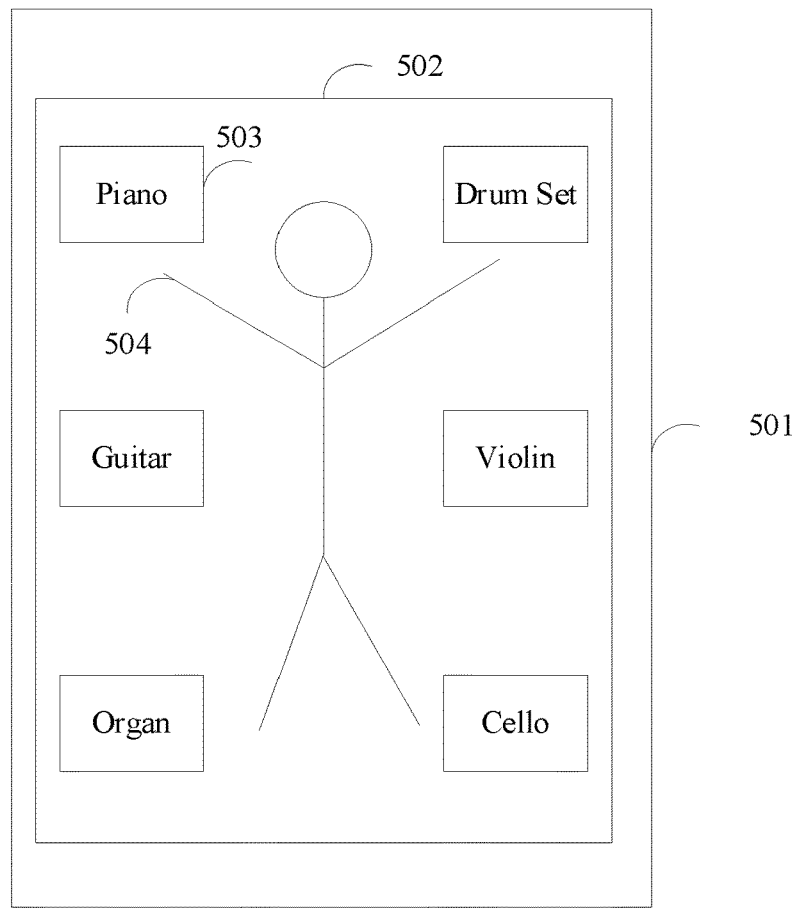
FIG. 5 is a schematic diagram of acquiring an interactive operation provided by at least an embodiment of the present disclosure.

For the embodiments of the present disclosure, for the convenience of description, a specific embodiment is taken as an example. When the terminal device responds to the music generation trigger operation of the user, the video capturing apparatus is opened to acquire the user video, and the user video is displayed on the playing interface. As shown in FIG. 5, a user video 502 and at least one music material identifier 503 are displayed on the playing interface 501, a target object 504 in the user video is identified, and the interactive operation between target object 504 and the music material identifier 503 are acquired. Optionally, the interactive operation between the target object and the music material identifier may be the target object staying in the display region of the music material identifier, or the action of the target object in the display region of the music material identifier. The music is generated according to the audio track corresponding to the music material identifier involved in the interactive operation.

In the embodiment of the present disclosure, the music material selection option is displayed on the playing interface, and the selection operation of the user on the music material is received. Based on the selection operation, the music material identifier to be displayed on the playing interface is determined. Users can select different music materials according to their own preferences to generate music, which is more personalized.

The embodiments of the present disclosure provide a possible implementation, and in this implementation, the touch action is determined as the target action when a duration of the touch action reaches a preset threshold.

In the embodiment of the present disclosure, whether the touch action is the target action is determined by the duration of the touch action of the target object.

For the embodiments of the present disclosure, for the convenience of description, taking a specific embodiment as an example, the target object is the hand of the user in the user video, and whether to output the audio track corresponding to the music material identifier as music is determined according to the duration of the hand of the user staying in the display region of the music material identifier. Specifically, when the hand of the user stays in the display region of the music material identifier for more than 0.3 seconds, the music is generated according to the audio track of the music material identifier. Of course, the time threshold may be set by those skilled in the art according to the actual situation, which is not limited in the present disclosure.

The embodiments of the present disclosure provide a possible implementation, in this implementation, generating the music according to the audio track of the target music material identifier for interactive operation includes:

in the case where there are at least two target sound effects corresponding to the target action at the same point of time, performing a beat alignment on the at least two target sound effects, and simultaneously playing the at least two target sound effects after the beat alignment.

In the embodiment of the present disclosure, there may be multiple objects that the target object interacts with at the same time. In the case where there are multiple music material identifiers that interact with the target object, the beat alignment is performed on the audio tracks corresponding to the multiple music material identifiers, and the audio tracks after the beat alignment are synthesized into music.

For the embodiments of the present disclosure, for the convenience of description, taking a specific embodiment as an example, after the terminal device captures the user video through the video capturing apparatus, the user video is displayed on the playing interface. The target object in the user video is the hands of the user, and the hands of the user may interact with two music material identifiers at the same time, then the beat alignment is performed on the audio tracks corresponding to the two music material identifiers, and two audio tracks after the beat alignment are synthesized into music. Specifically, if the hands of the user interact with identifiers of a piano and a drum set at the same time, then the beat alignment is performed on the audio tracks of the piano and the drum set according to the start time of the user's interactive operation with the two identifiers. Specifically, if the user interacts with the identifier of the piano first, the audio track corresponding to the piano starts to be played, and when the audio track corresponding to the piano is played, the hands of the user further interact with the identifier of the drum set, then the audio track corresponding to the drum set will be played at the next beat of the interactive operation between the hands of the user and the drum set in the audio track of the piano, thus completing the beat alignment of the two audio tracks, and synthesizing the two audio tracks after the beat alignment into music.

In the embodiment of the present disclosure, in the case where there are multiple music material identifiers corresponding to the interactive operation at the same time, the beat alignment is performed on the music corresponding to the multiple music material identifiers, and the audio tracks after the beat alignment are synthesized into music. Users can interact with multiple music material identifiers at the same time to form more diversified music.

Figure 6:
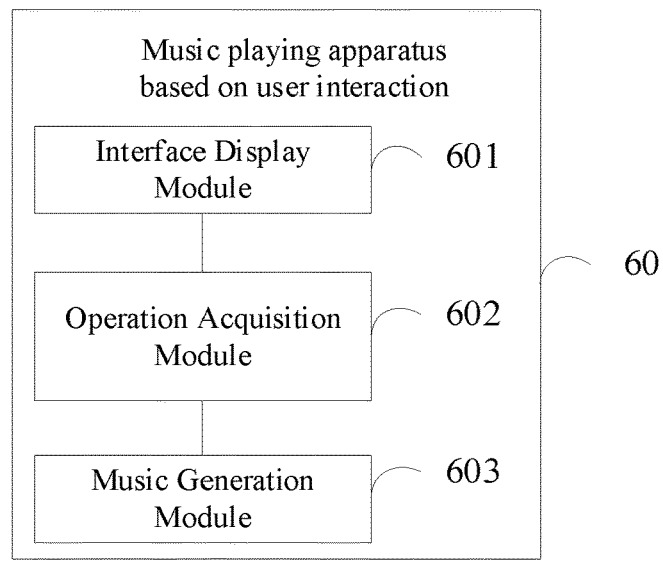
FIG. 6 is a schematic diagram of a structure of a music playing apparatus based on user interaction provided by at least an embodiment of the present disclosure.

The embodiments of the present disclosure further provide a music playing apparatus based on user interaction. As shown in FIG. 6, the music playing apparatus 60 based on user interaction includes:

a target video capturing module 601, which is configured to capture a target video through a video capturing apparatus;

a target action identification module 602, which is configured to determine an audio processing mode corresponding to a target action when a target object is identified to present the target action in the target video; and a music playing module 603, which is configured to play music according to the audio processing mode.

Optionally, when the music playing module 603 plays music according to the audio processing method, the audio processing mode specifically includes: adding a target audio track corresponding to the target action in the music for playing.

Optionally, the target action identification module 602 identifies that the target object presents the target action in the target video and determines the audio processing mode corresponding to the target action, the target action specifically includes a touch action, on a playing interface of the target video, of the target object to a target position on the playing interface; and the target position corresponds to the target audio track.

Optionally, the target audio track is configured to carry an audio of a target music material; and the target position on the playing interface is marked with an identifier of the target music material.

Optionally, when the music playing module 603 plays music according to the audio processing mode, the audio processing mode specifically includes: processing the music according to a target sound effect corresponding to the target action for playing.

Optionally, the target action identification module 602 identifies that the target object presents the target action in the target video and determines the audio processing mode corresponding to the target action, the target action specifically includes an action matching a preset posture; and the preset posture corresponds to the target sound effect.

Optionally, the target action identification module 602 is further configured to:

display a list of respective candidate music material identifiers when a trigger operation of a user for a music material selection option is received; and receive a music material selection operation of the user through the list of respective candidate music material identifiers and determine the identifier of the target music material according to a candidate music material identifier corresponding to the music material selection operation.

Optionally, the touch action is determined as the target action when a duration of the touch action reaches a preset threshold.

Optionally, when the music playing module 603 processes the music according to the target sound effect corresponding to the target action and then plays the music, the music playing module 603 is further configured to:

in the case where there are at least two target sound effects corresponding to the target action at the same point of time, perform a beat alignment on the at least two target sound effects, and simultaneously play the at least two target sound effects after the beat alignment.

The music playing apparatus based on user interaction in the embodiments of the present disclosure can execute the music playing method based on user interaction mentioned in the previous embodiments of the present disclosure, and the implementation principles thereof are similar, and are not repeated here.

The embodiment of the present disclosure displays a playing interface based on the music generation trigger operation of the user, displays the music material identifier on the playing interface, acquires the user's interactive operation on the displayed music material identifier based on the playing interface, and generates music according to the audio track of the target music material identifier corresponding to the interactive operation. Users can create personalized music according to their own operation, and the music creation is not restricted, which can enhance the fun of music creation and improve the user experience.

Figure 7:
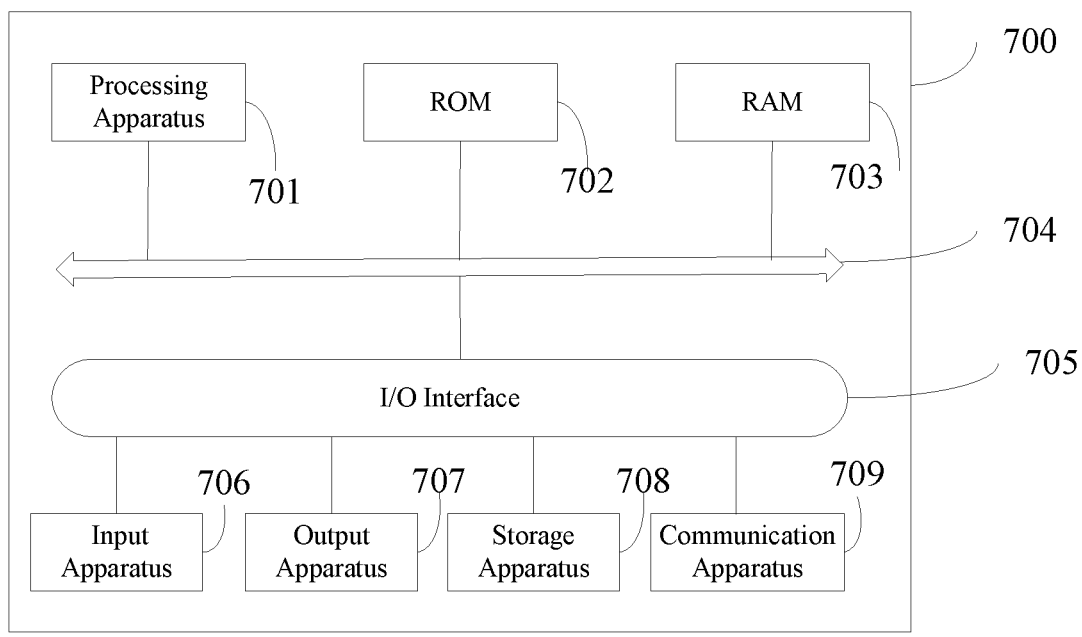
FIG. 7 is a schematic diagram of a structure of a device provided by at least an embodiment of the present disclosure.

Referring to FIG. 7, which shows a schematic diagram of a structure suitable for implementing an electronic device 700 of the embodiments of the present disclosure. The terminal device in the embodiments of the present disclosure may include, but not limited to, mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), or the like, and fixed terminals such as a digital TV, a desktop computer, or the like. The electronic device illustrated in FIG. 7 is merely an example, and should not pose any limitation to the functions and the range of use of the embodiments of the present disclosure.

The electronic device includes a memory and a processor, the processor herein may be called a processing apparatus 701 below, and the memory may include at least one of a read-only memory (ROM) 702, a random-access memory (RAM) 703, and a storage apparatus 708 below, which is specifically illustrated below.

As illustrated in FIG. 7, the electronic device 700 may include a processing apparatus 701 (e.g., a central processing unit, a graphics processing unit, etc.), which can perform various suitable actions and processing according to a program stored in a read-only memory (ROM) 702 or a program loaded from a storage apparatus 708 into a random-access memory (RAM) 703. The RAM 703 further stores various programs and data required for operations of the electronic device 700. The processing apparatus 701, the ROM 702, and the RAM 703 are interconnected by means of a bus 704. An input/output (I/O) interface 705 is also connected to the bus 704.

Usually, the following apparatus may be connected to the I/O interface 705: an input apparatus 706 including, for example, a touch screen, a touch pad, a keyboard, a mouse, a camera, a microphone, an accelerometer, a gyroscope, or the like; an output apparatus 707 including, for example, a liquid crystal display (LCD), a loudspeaker, a vibrator, or the like; a storage apparatus 708 including, for example, a magnetic tape, a hard disk, or the like; and a communication apparatus 709. The communication apparatus 709 may allow the electronic device 700 to be in wireless or wired communication with other devices to exchange data. While FIG. 7 illustrates the electronic device 700 having various apparatuses, it should be understood that not all of the illustrated apparatuses are necessarily implemented or included. More or fewer apparatuses may be implemented or included alternatively.

Particularly, according to the embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 709 and installed, or may be installed from the storage apparatus 708, or may be installed from the ROM 702. When the computer program is executed by the processing apparatus 701, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) or the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: display a playing interface in response to a music generation trigger operation of the user, and at least one music material identifier is displayed on the playing interface; acquire the user's interactive operation on the displayed music material identifier based on the playing interface; and generate music according to the audio track of the target music material identifier for the interactive operation.

The computer program codes for performing the operations of the present disclosure may be written in one or more programming languages or a combination thereof. The above-mentioned programming languages include object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments provided in the present disclosure, a possible implementation is provided, a music playing method based on user interaction is provided, and the method includes:

capturing a target video through a video capturing apparatus;

determining an audio processing mode corresponding to a target action when a target object is identified to present the target action in the target video; and playing music according to the audio processing mode.

Further, the audio processing mode specifically includes adding a target audio track corresponding to the target action in the music for playing.

Further, the target action specifically includes a touch action, on a playing interface of the target video, of the target object to a target position on the playing interface; and the target position corresponds to the target audio track.

Further, the target audio track is configured to carry an audio of a target music material; and the target position on the playing interface is marked with an identifier of the target music material.

Further, the audio processing mode specifically includes: processing the music according to a target sound effect corresponding to the target action for playing.

Further, the target action specifically includes an action matching a preset posture; and the preset posture corresponds to the target sound effect.

Further, the method further includes:

displaying a list of respective candidate music material identifiers when a trigger operation of a user for a music material selection option is received; and receiving a music material selection operation of the user through the list of respective candidate music material identifiers and determining the identifier of the target music material according to a candidate music material identifier corresponding to the music material selection operation.

Further, the touch action is determined as the target action when a duration of the touch action reaches a preset threshold.

Further, processing the music according to the target sound effect corresponding to the target action for playing includes:

in the case where there are at least two target sound effects corresponding to the target action at a same point of time, performing a beat alignment on the at least two target sound effects, and simultaneously playing the at least two target sound effects after the beat alignment.

According to one or more embodiments provided in the present disclosure, a possible implementation is provided, a music playing apparatus based on user interaction is provided, and the apparatus includes:

a target video capturing module, which is configured to capture a target video through a video capturing apparatus;

a target action identification module, which is configured to determine an audio processing mode corresponding to a target action when a target object is identified to present the target action in the target video; and a music playing module, which is configured to play music according to the audio processing mode.

Optionally, when the music playing module 603 plays music according to the audio processing method, the audio processing mode specifically includes: adding a target audio track corresponding to the target action in the music for playing.

Optionally, the target action identification module 602 identifies that the target object presents the target action in the target video and determines the audio processing mode corresponding to the target action, the target action specifically includes a touch action, on a playing interface of the target video, of the target object to a target position on the playing interface; and the target position corresponds to the target audio track.

Optionally, the target audio track is configured to carry an audio of a target music material; and the target position on the playing interface is marked with an identifier of the target music material.

Optionally, when the music playing module 603 plays music according to the audio processing mode, the audio processing mode specifically includes: processing the music according to a target sound effect corresponding to the target action for playing.

Optionally, the target action identification module 602 identifies that the target object presents the target action in the target video and determines the audio processing mode corresponding to the target action, the target action specifically includes an action matching a preset posture; and the preset posture corresponds to the target sound effect.

Optionally, the target action identification module 602 is further configured to:

display a list of respective candidate music material identifiers when a trigger operation of a user for a music material selection option is received; and receive a music material selection operation of the user through the list of respective candidate music material identifiers and determine the identifier of the target music material according to a candidate music material identifier corresponding to the music material selection operation.

Optionally, the touch action is determined as the target action when a duration of the touch action reaches a preset threshold.

Optionally, when the music playing module 603 processes the music according to the target sound effect corresponding to the target action and then plays the music, the music playing module 603 is further configured to:

in a case where there are at least two target sound effects corresponding to the target action at the same point of time, perform a beat alignment on the at least two target sound effects, and simultaneously play the at least two target sound effects after the beat alignment.

According to one or more embodiments provided in the present disclosure, a device is provided, including:
one or more processors;
a memory; and
one or more application programs, the one or more application programs are stored in the memory and configured to be executed by the one or more processors, and the one or more application programs are configured to execute the above-mentioned music playing method based on user interaction.

According to one or more embodiments provided in the present disclosure, a storage medium is provided, the storage medium stores at least one instruction, at least one piece of program, a code set or an instruction set, and the at least one instruction, the at least one piece of program, the code set or the instruction set is loaded and executed by a processor to implement the above-mentioned music playing method based on user interaction.

The above descriptions are merely optional embodiments of the present disclosure and illustrations of the technical principles employed. Those skilled in the art should understand that the scope of disclosure involved in the present disclosure is not limited to the technical solutions formed by the specific combination of the above-mentioned technical features, and should also cover, without departing from the above-mentioned disclosed concept, other technical solutions formed by any combination of the above-mentioned technical features or their equivalents, such as technical solutions which are formed by replacing the above-mentioned technical features with the technical features disclosed in the present disclosure (but not limited to) with similar functions.

Additionally, although operations are depicted in a particular order, it should not be understood that these operations are required to be performed in a specific order as illustrated or in a sequential order. Under certain circumstances, multitasking and parallel processing may be advantageous. Likewise, although the above discussion includes several specific implementation details, these should not be interpreted as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combinations.

Although the subject matter has been described in language specific to structural features and/or method logical actions, it should be understood that the subject matter defined in the appended claims is not necessarily limited to the specific features or actions described above. Rather, the specific features and actions described above are merely example forms of implementing the claims.

What is claimed is:

1. A music playing method based on user interaction, comprising:
capturing a target video through a video capturing apparatus;
determining an audio processing mode corresponding to a target action when a target object is identified to present the target action in the target video; and
playing music according to the audio processing mode,
wherein the audio processing mode comprises: processing the music according to a target sound effect corresponding to the target action and for playing,
wherein processing the music according to the target sound effect corresponding to the target action for playing comprises:
in a case where there are at least two target sound effects corresponding to the target action at a same point of time, performing a beat alignment on the at least two target sound effects, and simultaneously playing the at least two target sound effects after the beat alignment.

2. The method according to claim 1, wherein the audio processing mode comprises: adding a target audio track corresponding to the target action in the music for playing.

3. The method according to claim 2, wherein the target action comprises a touch action, on a playing interface of the target video, of the target object to a target position on the playing interface, and
the target position corresponds to the target audio track.

4. The method according to claim 3, wherein the target audio track is configured to carry an audio of a target music material, and
the target position on the playing interface is marked with an identifier of the target music material.

5. The method according to claim 1, wherein the target action comprises an action matching a preset posture, and
the preset posture corresponds to the target sound effect.

6. The method according to claim 4, further comprising:
displaying a list of respective candidate music material identifiers when a trigger operation of a user for a music material selection option is received; and
receiving a music material selection operation of the user through the list of respective candidate music material identifiers and determining the identifier of the target music material according to a candidate music material identifier corresponding to the music material selection operation.

7. The method according to claim 3, wherein the touch action is determined as the target action when a duration of the touch action reaches a preset threshold.

8. A device, comprising:
one or more processors;
a memory; and
one or more application programs, wherein the one or more application programs are stored in the memory and configured to be executed by the one or more processors, and the one or more application programs are configured to execute the music playing method based on user interaction according to claim 1.

9. A device, comprising:
one or more processors;
a memory; and
one or more application programs, wherein the one or more application programs are stored in the memory and configured to be executed by the one or more processors, and the one or more application programs are configured to execute the music playing method based on user interaction according to claim 6.

10. A non-volatile storage medium, wherein the storage medium stores at least one instruction, at least one piece of program, a code set or an instruction set, and the at least one instruction, the at least one piece of program, the code set or the instruction set is loaded and executed by a processor to implement the music playing method based on user interaction according to claim 1.

11. A non-volatile storage medium, wherein the storage medium stores at least one instruction, at least one piece of program, a code set or an instruction set, and the at least one instruction, the at least one piece of program, the code set or the instruction set is loaded and executed by a processor to implement the music playing method based on user interaction according to claim 6.

12. A music playing apparatus based on user interaction, comprising:
- a target video capturing module, configured to capture a target video through a video capturing apparatus;
- a target action identification module, configured to determine an audio processing mode corresponding to a target action when a target object is identified to present the target action in the target video; and
- a music playing module, configured to play music according to the audio processing mode,
- wherein the music playing module is configured to process the music according to a target sound effect corresponding to the target action and for playing,
- wherein the music playing module is further configured to:
  - in a case where there are at least two target sound effects corresponding to the target action at a same point of time, perform a beat alignment on the at least two target sound effects, and simultaneously playing the at least two target sound effects after the beat alignment.

13. The music playing apparatus according to claim 12, wherein the music playing module is further configured to add a target audio track corresponding to the target action in the music for playing.

14. The music playing apparatus according to claim 12, wherein the target action comprises an action matching a preset posture, and the preset posture corresponds to the target sound effect.

15. The music playing apparatus according to claim 13, wherein the target action comprises a touch action, on a playing interface of the target video, of the target object to a target position on the playing interface, and the target position corresponds to the target audio track.

16. The music playing apparatus according to claim 15, wherein the target audio track is configured to carry an audio of a target music material, and the target position on the playing interface is marked with an identifier of the target music material.

17. The music playing apparatus according to claim 15, wherein the touch action is determined as the target action when a duration of the touch action reaches a preset threshold.

18. The music playing apparatus according to claim 16, wherein the target action identification module is further configured to:
- display a list of respective candidate music material identifiers when a trigger operation of a user for a music material selection option is received; and
- receive a music material selection operation of the user through the list of respective candidate music material identifiers and determine the identifier of the target music material according to a candidate music material identifier corresponding to the music material selection operation.

\* \* \* \* \*